Figure 1:
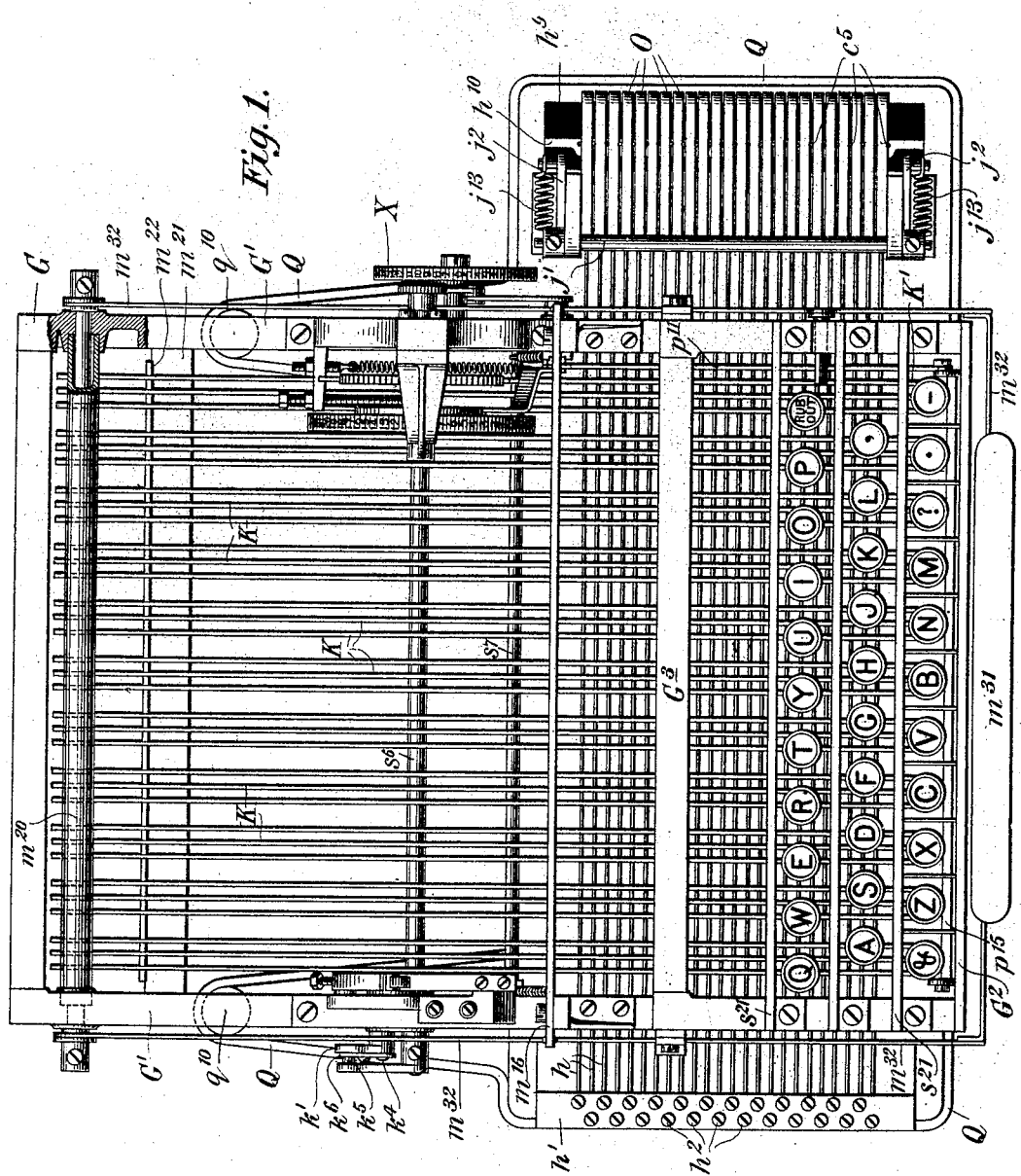

No. 765,456. PATENTED JULY 19, 1904.
C. L. BUCKINGHAM & E. GERMANN.
MACHINE FOR PERFORATING TELEGRAPH TAPES.
APPLICATION FILED NOV. 2, 1899.
NO MODEL. 9 SHEETS—SHEET 4.

WITNESSES:
C. E. Ashley
Edward H. Rogers.

INVENTORS:
C. L. Buckingham
E. Germann.
By their Attorney
C. L. Buckingham

No. 765,456. PATENTED JULY 19, 1904.
C. L. BUCKINGHAM & E. GERMANN.
MACHINE FOR PERFORATING TELEGRAPH TAPES.
APPLICATION FILED NOV. 2, 1899.
NO MODEL. 9 SHEETS—SHEET 5.

WITNESSES:
C. E. Ashley
Edward H. Rogers

INVENTORS:
C. L. Buckingham
E. Germann
By their Attorney
C. L. Buckingham

No. 765,456. PATENTED JULY 19, 1904.
C. L. BUCKINGHAM & E. GERMANN.
MACHINE FOR PERFORATING TELEGRAPH TAPES.
APPLICATION FILED NOV. 2, 1899.
NO MODEL. 9 SHEETS—SHEET 6.

Fig. 7,

WITNESSES:
C. E. Ashley
Edward T. Rogers

INVENTORS:
C. L. Buckingham
E. Germann
By their Attorney
C. L. Buckingham

No. 765,456. PATENTED JULY 19, 1904.
C. L. BUCKINGHAM & E. GERMANN.
MACHINE FOR PERFORATING TELEGRAPH TAPES.
APPLICATION FILED NOV. 2, 1899.
NO MODEL. 9 SHEETS—SHEET 7.

WITNESSES:
C. E. Ashley
Edward D. Rogers

INVENTORS:
C. L. Buckingham
E. Germann
By their Attorney
C. L. Buckingham

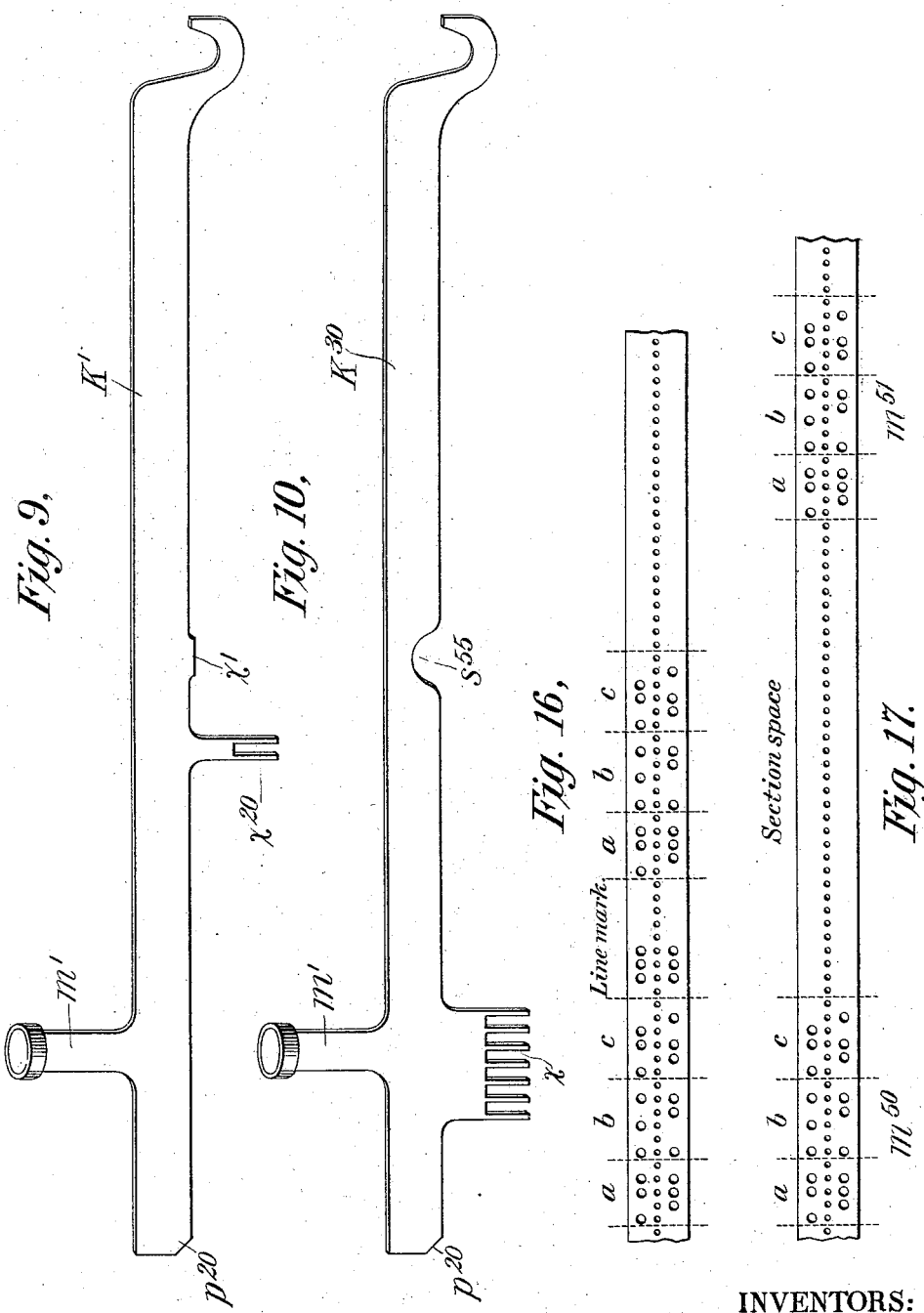

No. 765,456. PATENTED JULY 19, 1904.
C. L. BUCKINGHAM & E. GERMANN.
MACHINE FOR PERFORATING TELEGRAPH TAPES.
APPLICATION FILED NOV. 2, 1899.
NO MODEL. 9 SHEETS—SHEET 9.

Erase

Erase

WITNESSES:
C. E. Ashley
Edward H. Rogers

INVENTORS:
C. L. Buckingham
E. Germann
By their Attorney
C. L. Buckingham

No. 765,456. Patented July 19, 1904.

UNITED STATES PATENT OFFICE.

CHARLES L. BUCKINGHAM, OF NEW YORK, AND EMIL GERMANN, OF BROOKLYN, NEW YORK; SAID GERMANN ASSIGNOR TO SAID BUCKINGHAM.

MACHINE FOR PERFORATING TELEGRAPH-TAPES.

SPECIFICATION forming part of Letters Patent No. 765,456, dated July 19, 1904.

Application filed November 2, 1899. Serial No. 735,623. (No model.)

*To all whom it may concern:*

Be it known that we, CHARLES L. BUCKINGHAM, of the city and county of New York, and EMIL GERMANN, of the city of Brooklyn, county of Kings, State of New York, citizens of the United States of America, have made certain new and useful improvements relating to the preparation of telegraph-messages in tapes of paper or other suitable material for automatic transmission and for reproduction in page form by a type-printing telegraph, of which the following is a specification.

Short messages usually consist of four parts—to wit, first, the office-record and the name of the place from which the message is sent; second, the address; third, the body of the message, and, fourth, the signature. These parts might be printed continuously in one line after another with only blank spaces separating the adjoining parts; but according to the conventional form in the reproduction of messages no two of the parts or sections should appear on the same line. In other words, if one section were completed in the middle of a line or before its end the next section should be begun on the line following.

In the Hughes system, where messages are printed on paper tape, the strip is torn apart between sections and the parts thereof are pasted upon a blank in such manner as to present the message in the form above indicated. It is our purpose, however, to print the message directly upon a sheet of paper in such form, and to this end we have so arranged our perforating system that the tapes by which the messages are automatically transmitted may be rapidly prepared and that by the tapes thus produced for the purpose above indicated the messages may be transmitted with only a slight loss of time on the line. Our preparation of tape also contemplates an important improvement in that we are able to make the two sides of the duplex by which our printer system is operated practically independent each of the other.

In our United States Patent No. 657,510, of September 11, 1900, and No. 659,433, of October 9, 1900, we have described a perforating system for preparing messages for automatic transmission by various codes, and it is to this system that our present improvements are specially applicable, although in our present case we have described and claimed certain novel features which are applicable to systems in which the apparatus and the method therein disclosed might not be present.

To illustrate our present improvements and their uses in a complete system, we have reproduced from the drawings of our said Patent No. 657,510, Figures 5 to 12 and 21 to 24, inclusive, said diagrams being numbered in our present case, respectively, as Figs. 7, 1, 2, 3, 4, 5, 6, 8, 12, 13, 14, 15, and to these we have added Figs. 9 to 11 and 16, 17. It is to be noted, however, that from Fig. 17 of said Patent No. 657,510 we have added the contacts $B^{30}$ $B^{31}$ to Fig. 5 of said case.

Figure 2:
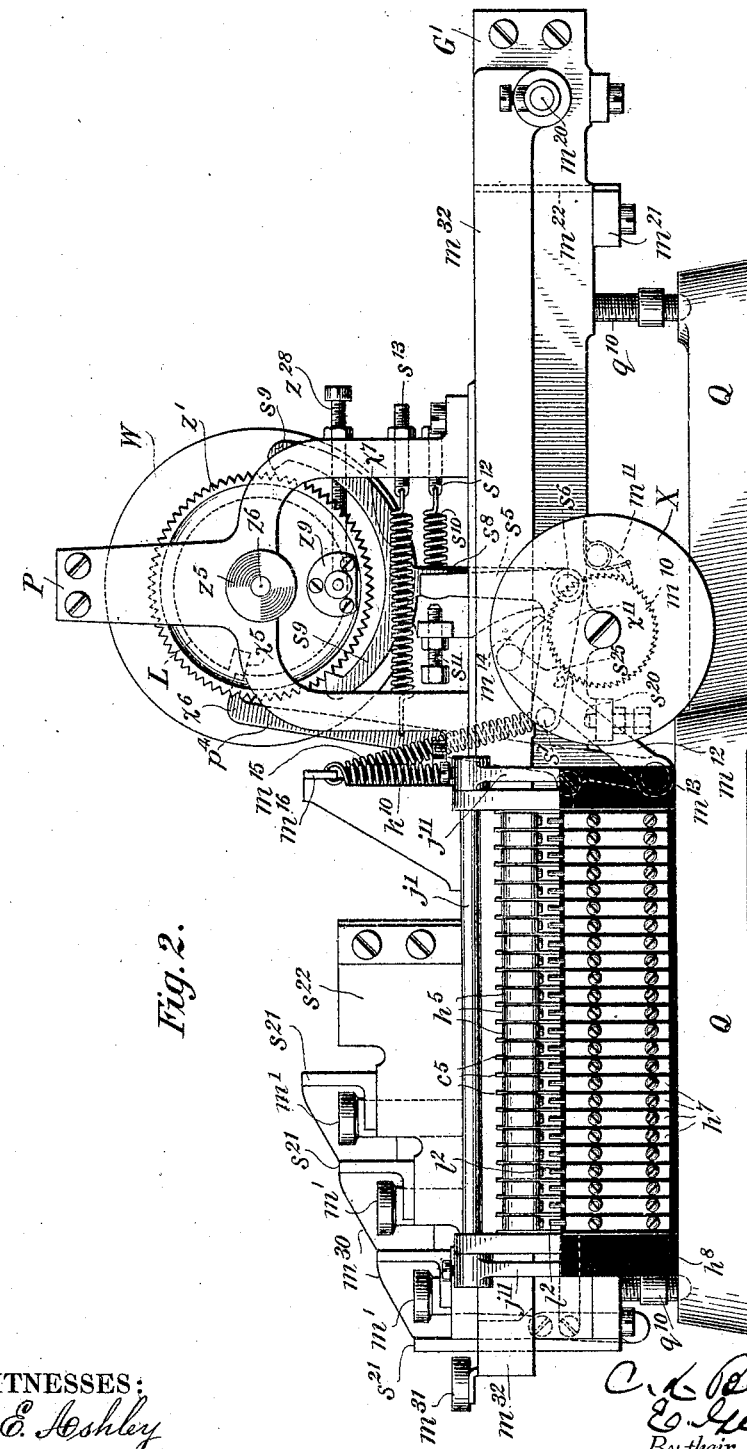
Figure 3:
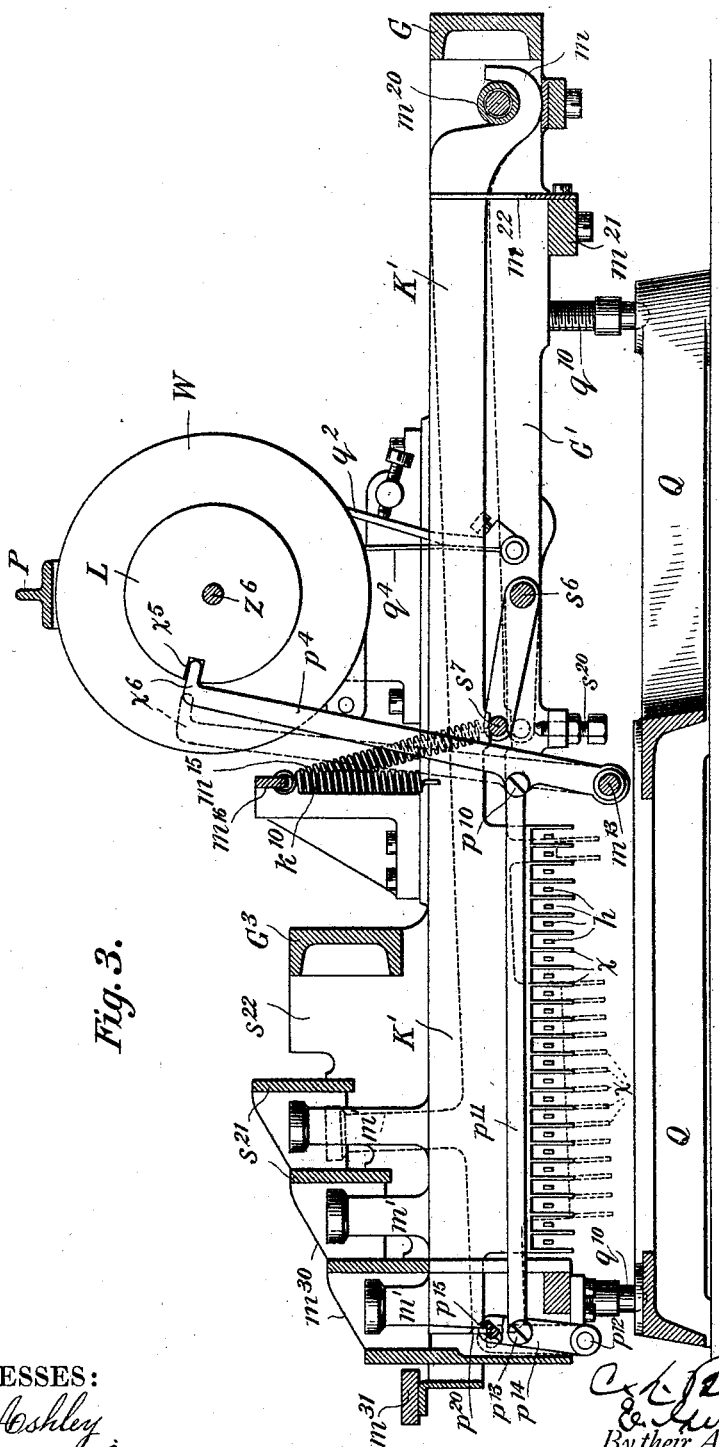
Figure 4:
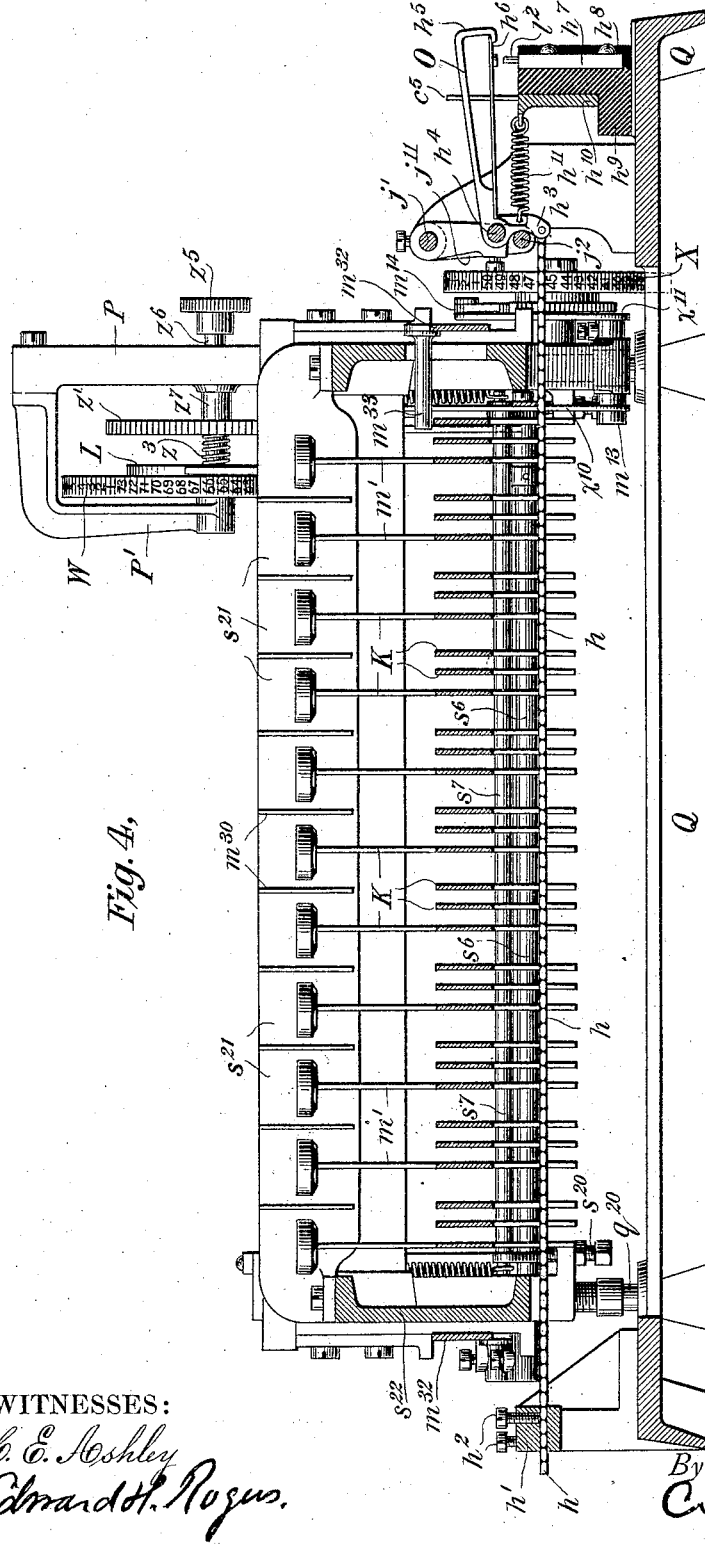
Figure 5:
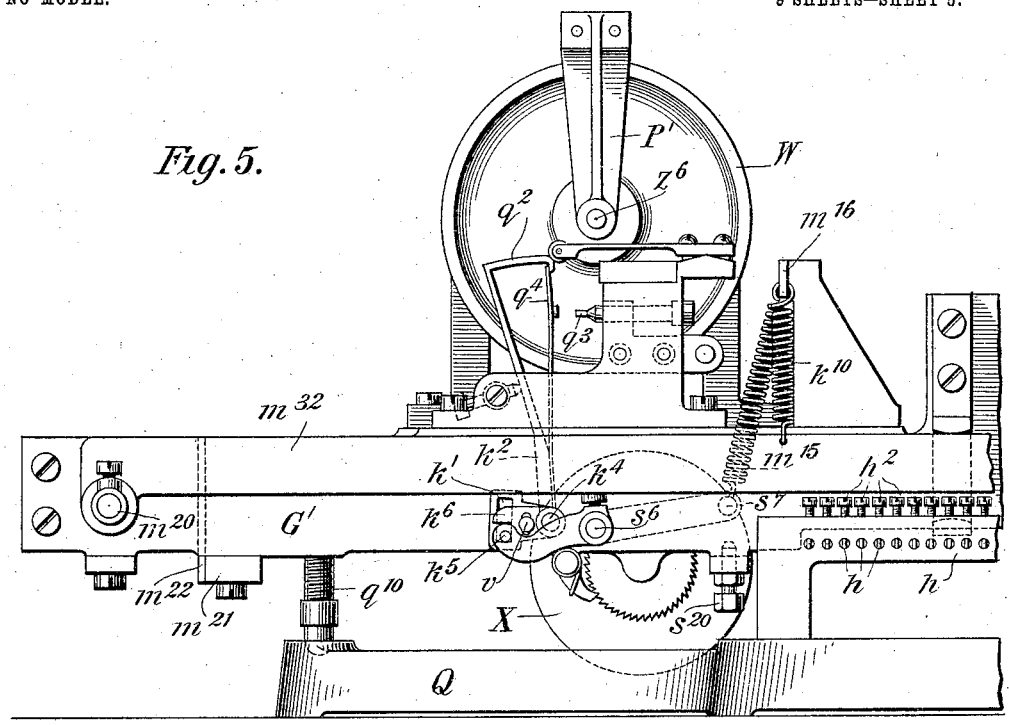
Figure 6:
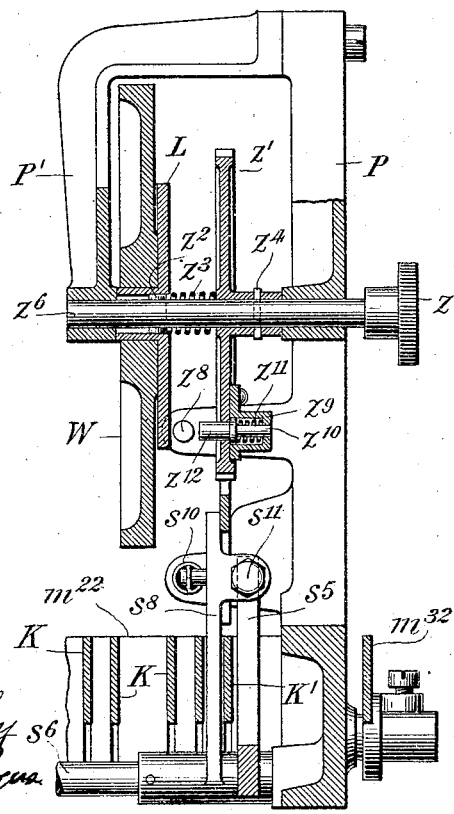
Figure 7:
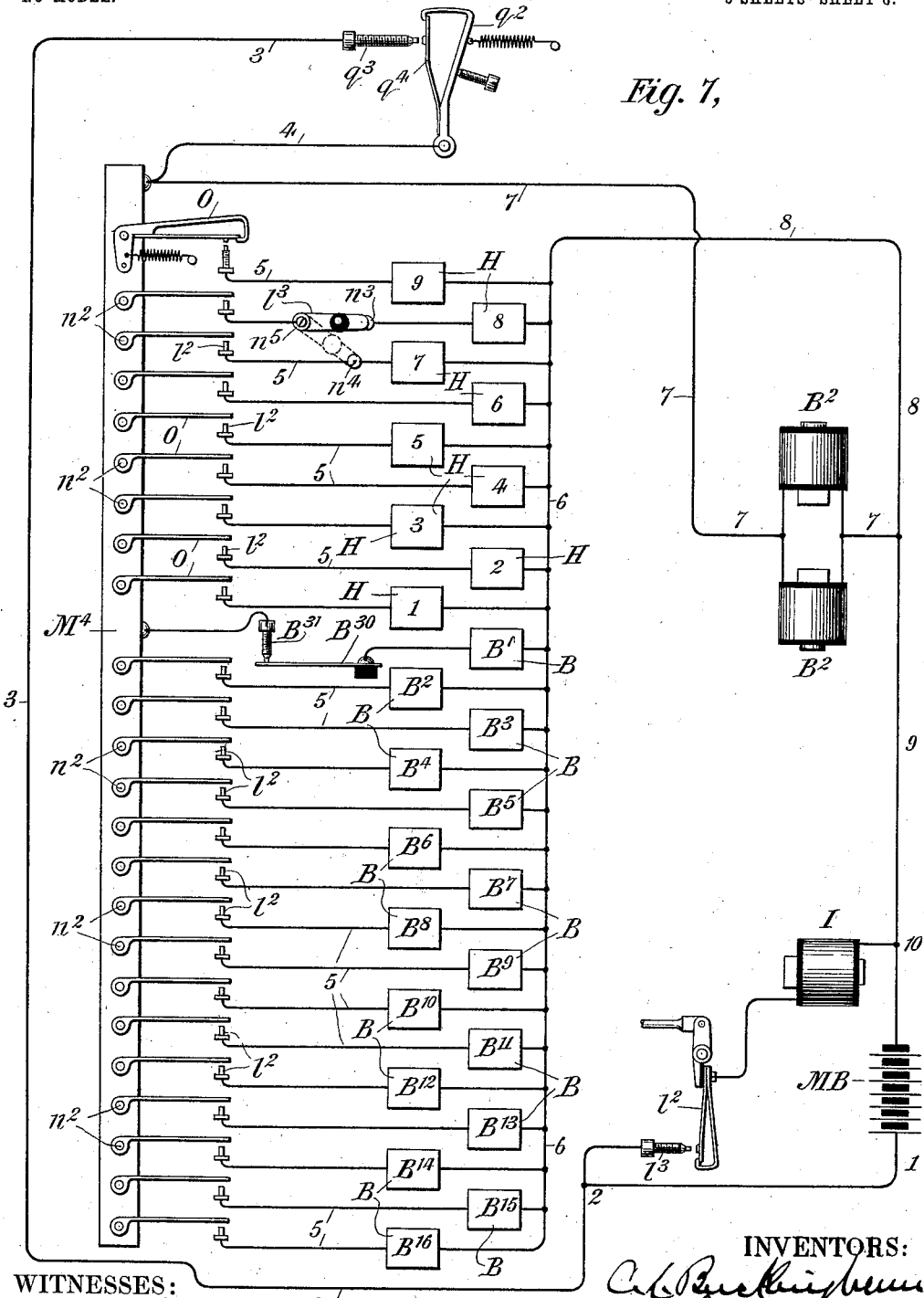
Figure 8:
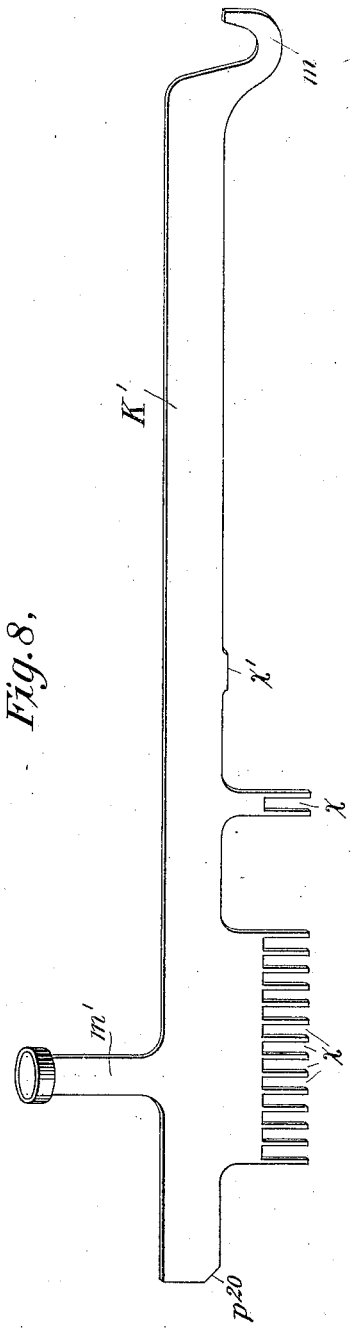
Figure 11:
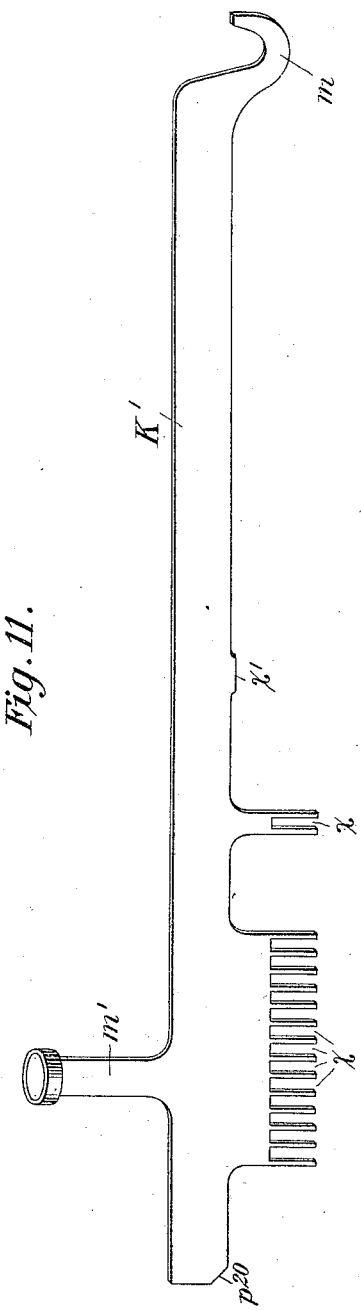
Figure 12:
Figure 13:
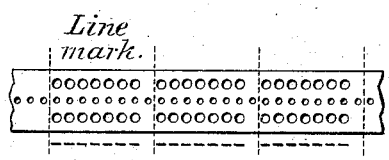
Figure 14:
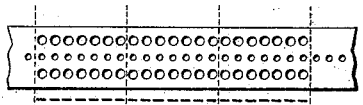
Figure 15:
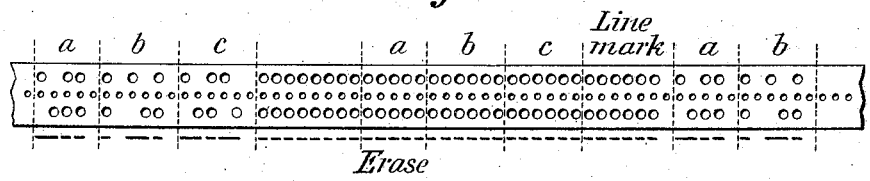

Fig. 1 is a plan view of our keyboard which by the present improvements we have adapted to prepare messages to be received in type-printed pages. Fig. 2 represents a side view of the apparatus shown in plan in Fig. 1, while Fig. 3 is a side view showing sectional portions of the keyboard represented in Figs. 1 and 2. Fig. 4 is an end view, partly in section, of said keyboard. Fig. 5 represents part of the registering and locking mechanisms and the common break apparatus of said keyboard, while Fig. 6 is a sectional view of the parts shown in Fig. 5. Fig. 7 represents a diagram of circuits, contact devices, and magnets for controlling the punches and feeding action of the perforator when used for preparing messages to be reproduced in type-printed characters. Fig. 8 is a side view showing one form of a line-marking key of our keyboard which may be used in preparing type-printed messages. Figs. 9 and 10 show other and preferred forms of line-marking keys, which are also adapted to other important uses. Fig. 11 represents a key similar to that of Fig. 8, but with its feed-notch $x$ so arranged as to cause the feed of the paper to cover only the length covered by the seven pairs of perforations and by which a continuous series of perforations may be made in the tape, as shown in Figs. 14 and 15. Fig. 12 is a diagram showing a line-mark or group of perforations separating two lines of a message adapted to be reproduced in page form upon a type-printer. Fig. 13 is a diagram showing three repetitions of the line-mark group represented in Fig. 12. Fig. 14 shows three repetitions of the line-mark group of Figs. 12 and 13, but with the spaces ending the groups omitted, thus representing an erasure, a rubout, or a divisional space between sections of a message. Fig. 15 shows the letters "a" "b" "c" of the printer-code with an intermediate erasure, rubout, or a divisional space between sections of a message. Fig. 16 represents the line-mark as produced by our preferred form of keys. (Shown in Figs. 9 and 10.) Fig. 17 shows a long blank space, the preferred form, between sections of a message as the same is produced by the line-mark key shown in Fig. 9.

Referring now to Fig. 7, it is seen that the series of feed-magnets $H'$ to $H^9$ and the punch-magnets $B^2$ to $B^{16}$ are shown with normally open contacts $l^2$, the latter being shown in Figs. 2 and 4 as extensions of the metallic connecting-bars $h^7$. In the arrangement of Fig. 7, which shows circuits of the keyboard for perforating printer-messages, magnet $B'$ is in a normally closed branch extending to the bar $M^4$; but in this branch a circuit-breaker is placed by which, as will more fully hereinafter appear, it is broken upon depressing key $K'$ of Fig. 9 shortly before the spring $q^4$ of the common break is forced by the arm $q^2$ into contact with screw $q^3$. We have also shown in Fig. 7 a switch $l^3$, by which upon the depression of a key which would normally actuate the eighth feed-magnet the seventh instead would be brought into action if said switch were turned from its contact $n^3$ to $n^4$. This expedient we have adopted in order that the line-mark key of Fig. 8 may be actuated either to produce a continuous series of dot perforations, as in Figs. 14 and 15, or a line-mark between the lines of a message, as in Fig. 12. This device, however, we regard as of little importance, from the fact that its use becomes unnecessary with the keys shown in Figs. 9 and 10.

To prepare a tape for printer-messages so that there may be a line arrangement in the printed sheet, we have shown in Figs. 1, 2, 3, 4, 5, 6 a rotary registering device which, with one exception, is given a step of rotation by the depression of each and every key of the board. By the perforation of a number of characters equal to the number in each line of the page to be printed the registering device is given a complete rotation, and upon the completion of such line a notch in a disk of the registering apparatus comes opposite a dogging-arm, into which it falls, and as the dogging-arm falls within the notch a bar is drawn under the free ends or tails of the keys, thereby preventing the downward movement of any key, excepting one, or the additional perforation of a character. The key $K'$, however, may yet be depressed, and to begin a new line it is touched by the operator. Two forms of such key are shown in Figs. 8 and 9, respectively, with an under inclined surface $p^{20}$, which in striking the locking cross-bar $p^{15}$ drives it backward, thus leaving the ends of the character-keys K free to be again depressed in perforating another line.

Figs. 1 to 6 show a wheel W bearing numbered divisions equal to those of the characters in lines of a printed page, which is supported upon a shaft $z^6$ within a bracket P P'. The shaft also carries a ratchet-wheel $z'$, which is rigidly attached thereto. Affixed to the wheel W is a disk L, within the periphery of which is a radial notch $x^5$ at a point corresponding with the zero-mark on the indicator-wheel W, and within such notch a toe $x^6$ of the arm $p^4$, Fig. 3, is permitted to drop at the completion of each line of the message. Arm $p^4$ is pivoted at $m^{13}$ and has joined thereto at point $p^{10}$ a horizontal bar $p^{11}$, which extends toward the front of the keyboard, and at its end $p^{13}$ is pivoted an upright arm $p^{14}$. Such arm is supported upon a rock-shaft $p^{12}$, which extends across the front of the keyboard and has at its opposite end a second upright arm $p^{14}$. The arms $p^{14}$ carry at their upper ends a cross-bar $p^{15}$, having a flat upper surface and a flat side surface next to the keys, and as the dog $x^6$ drops within the notch $x^5$ said bar $p^{15}$ is brought a short distance under the vibrating ends of the keys of the keyboard, excepting key $K'$. The beveled surface $p^{20}$ of key $K'$ is shown in Figs. 2 and 3, as well as in Fig. 8. As particularly shown in Fig. 6, the wheel W and notched disk L are fixed together and to the shaft in such manner that they must rotate therewith in a definite plane; but the shaft itself may be moved along its axis, there being a pin $z^2$ upon the shaft, which may slide within an axial groove of W and L. The ratchet-wheel $z'$ being rigidly affixed to the shaft $z^6$ must not only rotate therewith but partake of its longitudinal movement as well. By pressing a knob $z^5$ the ratchet-wheel $z'$ may be thrust to the left to clear the teeth of the escapement-pallets by which it is driven or controlled, and when so moved a spring $z^3$ is compressed, which when the pressure is removed returns the wheel $z'$ into connection with the pallets. The wheel $z'$ is also provided with a pin $z^{12}$, which is adapted to be arrested by a long horizontal stationary stop-pin $z^8$ after the wheel has been turned to its zero position. If after the perforation of a few characters it were attempted to disconnect the teeth of the escapement-wheel from their pallets and to return the wheel to its zero position by first pushing the knob $z^5$ and then returning it, pin $z^{12}$ would strike the side of the stop-pin $z^8$, and if pin $z^{12}$ were rigidly fixed to the wheel it could not be moved away from the pallets. To avoid this difficulty, the pin $z^{12}$ is made free to slide within the wheel. The pin is provided with a shoulder, as seen in Fig. 6, against which presses a spiral spring $z^{11}$, the other end of said spring being confined in a housing or thimble $z^9$, which is rigidly fixed to the disk $z'$. Thus it is seen that if knob $z^5$ were pressed inward when the end of $z^{12}$ were opposite $z^8$ the end of pin $z^{12}$ would be pressed downward within the disk by the stop $z^8$; but upon turning the knob $z^5$ the spring $z^{11}$ would assert itself and would thrust pin $z^{12}$ outward after passing the stop $z^8$ into a position to be finally arrested by the end of said stop. Pallets $s^9$ for driving or controlling the ratchet-wheel $z'$ are mounted upon a downwardly-projecting arm $s^8$, which is loosely supported upon a shaft $s^6$, while rigidly connected to the shaft close to said arm is an arm $s^5$, which upon the depression of any finger-key of the keyboard, with one exception, strikes an adjustable projection $s^{11}$, which is rigidly attached to the arm $s^8$, carrying the pallets, and by these means, as appears from Fig. 2, the finger-keys may be depressed a considerable distance before arm $s^5$ reaches the pin $s^{11}$ to move the pallets. Normally the pallet-arm $s^8$ is drawn toward the right by spring $s^{10}$, one end of the spring being attached to the pallet-arm and the other to the fixed support $s^{12}$. Arm $s^5$ is rigidly attached to rock-shaft $s^6$, which carries at its opposite end or at the other side of the keyboard the common break apparatus by which the common return-circuit of the perforating system is opened and closed with each depression of a key and is so timed as to close said circuit shortly after the individual branches are connected by the contact-levers O and to break the same shortly before the contacts are separated by said levers. By this means the spark of the system is taken up between points $q^3$ and spring $q^4$ of the common break. Spring $q^4$ is attached to a vibrating arm $q^2$, having a horizontal hook which receives motion from a rock-shaft $s^6$, to which are attached side arms carrying at their free ends a rod $s^7$, the latter being normally held in an upright position by springs $m^{15}$, which are supported from a cross-bar $m^{16}$—a bar from which the key-lever springs $k^{10}$, one for each key, are also hung. It will thus be seen that the keys are normally held in an upright position by springs $m^{15}$ and $k^{10}$ and that upon depressing any key of the keyboard its spring $k^{10}$ and spring $m^{15}$ will be elongated and that the projections $x'$, seen upon the lower side of the keys, as in Figs. 2, 3, and 8, will press the cross-bar $s^7$ downward until said bar is arrested by stops $s^{20}$. By so depressing bar $s^7$ the rock-bar $s^6$ is rotated at its opposite end and with it an arm which carries a pin $k^5$, and as the pin $k^5$ passes within a slot $k'$ of an auxiliary arm which is rigidly affixed to the shaft bearing the common break-arm $q^2$ both the register and common break are operated in unison one with the other. The slot $k'$ within which the pin $k^5$ vibrates may be lengthened or shortened at the pleasure of the operator by a latch-piece $k^6$, also having a slotted opening whereby it may be clamped in a higher or lower position to increase or diminish the length of that part of slot $k'$ within which $k^5$ vibrates and by which lost motion is obtained at the common break. These adjustments of the common break, as well as the adjustability of the contacts $s^{11}$ of the escapement-pallets of the register, are essential, as it is necessary that these two devices should work in unison and that both should have a considerable amount of lost motion. The pallets should never cause the register to be turned a step except as the common break is closed. As no character can be perforated without closing the common break, it would lead to confusion if the indicator were to show a character perforated when such had not been the case. On the other hand, the register must not fail to move a step upon closing the common break, for upon closing the common break a character will be perforated, and it would also lead to confusion if such perforation were not indicated. In other words, if the registering apparatus and the common break were not to operate in unison, seventy-five characters instead of seventy-four might be perforated for a line, or perhaps but seventy-three. Lost motion at the common break is also necessary to quicken its action, while at the register it would be desirable, if for no other purpose than to lighten the action of the keyboard under the operator's touch.

Another feature of our perforating system set forth in our said Patent No. 657,510 is a registering device for indicating the number of lines that at any time have been perforated. A device for this purpose is shown in Figs. 1 to 5. During the normal operation of the keyboards the tooth $x^6$ of the bar $p^4$ rests upon the periphery of the wheel L, where it is held under tension of spring $x^7$, one end of which is fixed to a connecting-screw $s^{13}$; but when notch $x^5$ of the disk comes opposite toe $x^6$ the spring $x^7$ quickly draws the toe within the notch. By this means the arm $p^4$ is given one movement for each line of the message perforated, and this movement we convey to a rotary indicator X by means of an arm $m^{12}$ and a driving-pallet $m^{14}$. The pallet $m^{14}$ engages the ratchet-teeth of wheel $m^{10}$, while upon said arm $m^{12}$ is an auxiliary tooth $s^{25}$, which with each movement of $m^{12}$ is brought within the notches of the ratchet-wheel to prevent overthrow or a movement representing more than one tooth of the wheel at a step. The pawl $m^{11}$, as shown in Fig. 2, is also provided to prevent back movement of the ratchet-wheel.

Referring again to key K', it will be seen that in the construction hereinbefore described said key may be repeatedly operated without interfering with the register which indicates the number of lines. When the disk L is locked, the depression of the line-mark key will move the locking-bar $p^{15}$ backward and draw the toe $x^6$ out of the notch $x^5$, thereafter leaving the toe $x^6$ supported upon the outer periphery of L, and while the toe is supported in this position the arm $m^{12}$ and pawl $m^{14}$ will be held well back from the teeth of wheel $m^{10}$.

The key-levers of our perforating-keyboard are all constructed in one piece, as shown in Figs. 8, 9, 10, and 11, with the exception of the finger-buttons, which are mounted upon the upwardly-projecting shanks $m'$, and each key is provided with a slight lower projection $x'$, which upon being depressed comes in contact with the vibrating bar $s^7$, thereby turning rock-shaft $s^6$ to actuate the common break and the line-registering apparatus. Each key is also provided with downward-notched projections $x\ x$ for bringing into action the various parts of the perforator. The perforator proper, as shown in our Patent No. 659,433, has nine different steps of feed for the feed-wheel, nine respective magnets for controlling said steps, nine circuits leading from said magnets to the keyboard, and in the keyboard there are nine chains for controlling the nine steps of feed-action.

Many letters or characters are of equal length, and the keys representing such letters all act upon one chain, and in such cases the feed-notches $x$ all keep the same lengthwise position; but for letters of different length the feed-notches are differently placed along the lengths of the keys. In addition to the notched projections for controlling the feed there are on each character-key for preparing printer-messages five notches for controlling the punch-magnets. These notches are variously distributed along the length of the keys and in such manner that a key may depress those chains which actuate the particular levers O which close the branches leading to the magnets of the required punches. For example, as will be seen from Fig. 12, the first, third, and fourth of the punches of the upper row and the second, third, and fourth of the lower row must be brought into action to perforate the letter "a," while the letter "b" will be perforated by actuating the first, third, and fifth of the upper punches of the first, fourth, and fifth of the lower row, and the letter "c" is perforated by bringing into action the first, third, and fourth of the upper row and the second, third, and fifth of the lower row. It will also be noticed from this figure that in perforating the letter "a" the fifth feed-magnet must be actuated, while the sixth is employed for either "b" or "c." When the line-marking key, Fig. 8, is depressed, the first seven punches in both the upper and lower rows are actuated, and with them the eighth feed-magnet. In using this line-marking key, however, for an erasure or a divisional space the same punches are operated; but the seventh feed-magnet instead of the eighth will be brought into action; but, as will presently be shown, when K' and $K^{30}$, Figs. 9 and 10, are depressed, only the second, third, and fourth pairs of punch-magnets become operative, and here the ninth feed-magnet is energized.

As has already been indicated, a continuous series of dot-perforations may be made to divide or separate the sections of a message, and with the line-mark key K' (shown in Fig. 8) such a series of dot-perforations may be made by moving switch $l^3$ upon contact $n^3$, Fig. 7, and repeatedly operating key K'; but the better plan is to separate the several sections of a message by an unperforated length of tape.

In our preferred construction we employ a separate key for making the "rub-outs" or erasures and make the releasing-key K' with only one notch $x^{20}$, as shown in Fig. 9, said notch being so located as to actuate that chain or contact controlling the longest feed of the tape. Thus by this means the paper strip in the perforator may be fed nine central holes at each stroke of key K', and by only a few touches of said key a long length of blank tape, as shown in Fig. 17, may be quickly fed through the punch-head; but in this case, as for Morse, it is necessary to cause the downward movement of the key K' to break the circuit of punch-magnet B', as in Fig. 7, by automatically opening $B^{30}\ B^{31}$; otherwise at each operation of the key the first upper punch would be operated to make a perforation.

In order that we may print short messages in separate sections, preferably with the office record on one line, the address on another, the body of the message on succeeding lines, and the signature on a separate line below, it is necessary after each section of the message has been printed to disconnect the feed-wheel of the page-printer (shown in our United States Patent, No. 579,634, of March 30, 1897,) from the escapement-pallets, so that the sheet of paper will quickly move to position to begin a new line; but during this time, as the printer must remain unaffected by pulses coming from the line, preferably no pulse should be sent.

After perforating a section of the message and quickly feeding several inches of the tape past the punch-head the indicator, Figs. 1 to 5, is set by the operator at its initial position, so as to begin the next section of the message at the beginning of the next line. That there is little delay in perforating messages caused by this operation is apparent from the fact that in practice the blank space, Fig. 17, is less than four inches long and is made by depressing key K' only four times; nor is the delay upon the line considerable, for the time occupied in passing the blank section of tape through the Wheatstone transmitter is only one second or less, which is a sufficient time for the feed-wheel of the printer to be disengaged from its pallet by the operator, for the paper sheet to be brought to position for commencing a new line, and for the escapement to be reëngaged with its pallets; but with the registering device already described one further auxiliary becomes necessary. As the register shown, Figs. 1 to 5, is constructed to make one revolution for each seventy-four characters perforated, (the number of characters produced per line by our printer,) the key K', if it were actuated at the commencement of a line to make the line-mark and to release the lock-bar $p^{15}$ from beneath the finger-keys K, would move the indicator one of its seventy-four steps without perforating a character or without producing any such record in the tape as would cause the printer-feed to act. In other words, only seventy-three characters would be perforated for each line. This difficulty we overcome by employing key $K^{30}$ as an auxiliary to K', Fig. 10, which of itself has no capacity either to actuate the indicator of the keyboard to operate the common break or to call into action either punch or feed magnets. It has, however, six notches $x$, which engage with the six chains $h$, which would actuate the six punches 3 to 8, inclusive, of the series and perforate holes in the tape, but only if the key K', Fig. 9, were also depressed. All of the keys K and key K' (shown in Figs. 1 to 4) are provided with downward projections $x'$, which when said keys are depressed act upon the depressible cross-rod $s^7$ to actuate the common break $q^2 q^4$ and the driving-pallets $s^9$ of the indicator; but $K^{30}$ is provided with a notch $s^{55}$ in place of a projection $x'$, so that as this key is depressed it may not actuate the cross-rod $s^7$ or affect the indicator or the common break. To depress only key $K^{30}$ would therefore result in nothing; but if it were depressed by the left hand while K' of Fig. 9 was depressed by the right the six required perforations would be made. By means of these perforations the printer-feed would be actuated one step, and the character seen in Fig. 16 would at the same time be made sufficiently distinctive to mark the end of one line and the beginning of the next in the perforated message. Eight, ten, or a larger even number of holes might be punched for the line-mark; but two or four would not be sufficient, as no less than six holes would send enough reversed pulses to line to actuate the printer-feed the one required step.

As illustrated in Fig. 16, one line of the perforated message is completed by letters "a," "b," "c" at the left of the line-mark, while a new line has been begun by the same letters at the right.

From what has preceded it may now be seen that the auxiliary key may be wholly ignored by the operator in preparing short messages where the sections occupy only parts of lines; but key $K^{30}$, as well as K', Fig. 9, must be depressed at the beginning of each line wherever a part of the message extends from one line to the next, for otherwise only seventy-three characters to the line would be perforated and the margin of the printed page at the receiver would be imperfect. As already stated, such space between the four sections of a message might consist of a solid series of dot-holes in the tape, as shown in Figs. 14, 15, for although a long series of dot pulses would be sent over the line while such section was running through the Wheatstone transmitter the printer would remain unaffected, and during such time the feed-wheel of the printer might be disengaged from and reëngaged with its escapement-pallets to bring the paper sheet to an initial position for the commencement of a new line. In fact, this plan has proven successful in practice; but to leave the section-space a plain blank, as in Fig. 17, is preferable for many reasons. If it were necessary to punch seven or eight pairs of holes at each depression of K', Fig. 8, the touch of the key to the operator would be less easy than where, as in Fig. 9, it is necessary to depress one chain only, and, again, the spark at the common break would be greatly increased if fourteen or sixteen punch-magnets were simultaneously brought into multiple circuit. Moreover, the paper tape could not be fed more than the space of eight central holes without adding another pair of punches, whereas as the machine now stands the tape may be fed a space of nine central holes at each step, and, again, if the spaces between sections were made a series of dots the operator would be obliged to move the switch $l^3$ from $n^3$ to $n^4$ and from $n^4$ to $n^3$ four times for each message; but aside from these advantages there is one that is far more important. By employing a blank between the message-sections we are able to more nearly make one side of a duplex practically independent of the other when sending printer-messages in opposite directions on one wire.

To more fully indicate the purposes of our invention, and particularly the advantages of blank divisional spaces as compared with a solid series of perforations, we will now show the special applicability of the blank space to the duplex telegraph as it is employed with the Wheatstone transmitter and our printing-telegraph receiver upon which messages are reproduced in page form, although this feature is not herein claimed, it having been made the subject of a divisional application, the claims of which, 1 to 8, were originally 7 to 14 herein.

In the ordinary duplex if one receiving operator breaks back to the distant transmitting end to question the transmitting operator the work of the other side or of the other transmitter and receiver is put in confusion and must be suspended. In other words, if the receiver on one side of a duplex finds it necessary to question his transmitting correspondent the two persons on the other side must wait. In our system, however, a receiving operator may call or signal to his sending operator whenever a blank space of tape is passing through the Wheatstone transmitter. For all practical purposes a receiving operator is able to send such signals as are necessary by merely making three Morse dots—the letter "s"—when he sees a blank between sections passing through the Wheatstone transmitter at his own station. If a swing on the wire has resulted in mutilating a message, the receiving operator merely sends a Morse letter "s" under the conditions above outlined to the transmitting end, which means that the transmitting operator should rerun his tape. If, however, the fault were repeated during the rerun, the tape would be examined, and if imperfect the message would be reperforated. By this means a receiving operator in New York may give all necessary signals to his transmitter in Chicago without in any manner interfering with the message which at the time New York is sending to Chicago.

What we claim, and desire to secure by Letters Patent, is—

1. In a perforating-machine, the combination of a series of punches, a feeding device, a key for actuating the controlling apparatus to feed a paper strip without causing perforations, and a register which is also actuated by said key.

2. In a perforating-machine, the combination of a series of punches, a feeding device, a key for actuating the feed-controlling apparatus to feed a paper strip without causing perforations, a registering mechanism which is also actuated by said key, and an auxiliary key which, in conjunction with the first, is adapted to actuate a group of punches.

3. In a perforating-machine, the combination of a series of punches, a feeding device, and two supplemental keys, one of which serves to feed a paper strip without causing perforations; but which, in conjunction with the other, serves to feed the paper and effect perforations.

4. As a means for preparing messages for reproduction in page form, the combination of a perforating apparatus having a series of punches, a feeding device, a registering mechanism for indicating the number of characters per line, and two supplemental keys, one of which serves to feed a paper tape and actuate the register, and which, in conjunction with the other, serves to feed the paper, actuate the register and effect perforations.

5. In a perforating system, a series of perforating-punches, a device for feeding a strip of paper, a series of keys, K, for controlling the action of the punches in groups representing different letters or characters, a line-registering device for indicating and determining the number of characters perforated, a key $K'$ having but one feed-controlling notch, device or projection, $x^{20}$, and an auxiliary key $K^{30}$, having a series of notches, devices or projections for determining the punches to be actuated.

6. In a perforating system, the combination of paper-feeding apparatus, punching devices and a line-marking arrangement consisting of key $K'$ having a single notch or device, $x^{20}$, representing one step of the feeding apparatus, and key $K^{30}$ which is auxiliary to key $K'$, having notches or devices for determining the number of punches to be called into action.

CHARLES L. BUCKINGHAM.
EMIL GERMANN.

Witnesses:
JOHN C. SANDERS,
WM. ELLIS.